(12) United States Patent
Landgraf et al.

(10) Patent No.: US 10,076,755 B2
(45) Date of Patent: Sep. 18, 2018

(54) RECOGNIZABLE CARRIER FOR OPTICAL MEASUREMENT METHODS

(75) Inventors: Johannes Landgraf, Karlsruhe (DE); Günther Proll, Denkendorf (DE); Florian Pröll, Mannheim (DE)

(73) Assignee: Biametrics GmbH, Tuebingen (DE)

( * ) Notice: Subject to any disclaimer, the term of this patent is extended or adjusted under 35 U.S.C. 154(b) by 1411 days.

(21) Appl. No.: 13/318,827

(22) PCT Filed: May 4, 2010

(86) PCT No.: PCT/EP2010/002728
§ 371 (c)(1),
(2), (4) Date: Nov. 4, 2011

(87) PCT Pub. No.: WO2010/127834
PCT Pub. Date: Nov. 11, 2010

(65) Prior Publication Data
US 2012/0052597 A1  Mar. 1, 2012

(30) Foreign Application Priority Data
May 4, 2009   (DE) ........................ 10 2009 019 476

(51) Int. Cl.
*B01L 3/00*  (2006.01)
*B01J 19/00*  (2006.01)
(52) U.S. Cl.
CPC ............. *B01L 3/54* (2013.01); *B01J 19/0046* (2013.01); *B01J 2219/0056* (2013.01);
(Continued)
(58) Field of Classification Search
None
See application file for complete search history.

(56) References Cited

U.S. PATENT DOCUMENTS

| 6,869,763 B1 | 3/2005 | Tamura et al. |
| 2002/0137059 A1 | 9/2002 | Wu et al. |

(Continued)

FOREIGN PATENT DOCUMENTS

| DE | 600 22 043 T3 | 6/2006 |
| EP | 1 388 587 A1 | 2/2004 |

(Continued)

OTHER PUBLICATIONS

International Search Report issued by the European Patent Office in International Application PCT/EP2010/002728.
(Continued)

*Primary Examiner* — Melanie Yu Brown
*Assistant Examiner* — Richard P Moerschell
(74) *Attorney, Agent, or Firm* — Muncy, Geissler, Olds & Lowe, P.C.

(57) ABSTRACT

The invention relates to a recognizable carrier for determining physical, chemical or biochemical interactions by means of optical measurement methods. The carrier comprises a surface that defines a substrate surface and that has a base layer coated with reactive elements, which are bonded to receptor molecules, wherein the base layer and/or the reactive elements are provided with a pattern of holes which forms a code and/or the reactive elements are provided with linker molecules or markers which form a code. The substrate surface may additionally have a macroscopically planar pattern which is applied using laser light or chemical etching and forms a code. The invention likewise relates to a method for producing a recognizable carrier for spectroscopic processes and/or intensiometric tests to determine said interactions. The code to recognize the carrier can be controlled via a read-out unit coupled to the photometric analysis unit. Such a carrier can be used to analyze biomol- (Continued)

ecules during security checks, access controls or in-vitro diagnostics.

10 Claims, 2 Drawing Sheets

(52) U.S. Cl.
CPC ............ *B01J 2219/00315* (2013.01); *B01J 2219/00527* (2013.01); *B01J 2219/00547* (2013.01); *B01J 2219/00549* (2013.01); *B01J 2219/00551* (2013.01); *B01J 2219/00605* (2013.01); *B01J 2219/00612* (2013.01); *B01J 2219/00617* (2013.01); *B01J 2219/00621* (2013.01); *B01J 2219/00637* (2013.01); *B01J 2219/00659* (2013.01); *B01J 2219/00662* (2013.01); *B01L 2200/12* (2013.01); *B01L 2300/021* (2013.01); *B01L 2300/0636* (2013.01)

(56) References Cited

U.S. PATENT DOCUMENTS

| | | | |
|---|---|---|---|
| 2002/0147332 A1* | 10/2002 | Kaneko | C07H 19/06 536/26.1 |
| 2004/0070764 A1* | 4/2004 | Fujimura | G01N 21/55 356/445 |
| 2004/0259083 A1 | 12/2004 | Oshima | |
| 2005/0026193 A1* | 2/2005 | Kris | C12Q 1/6837 435/6.11 |
| 2005/0049796 A1 | 3/2005 | Webb et al. | |
| 2005/0227271 A1 | 10/2005 | Kwon | |

FOREIGN PATENT DOCUMENTS

| | | | |
|---|---|---|---|
| EP | 1 584 372 A2 | 10/2005 | |
| EP | 1584372 A2 * | 10/2005 | ............ B01J 19/00 |
| GB | 2 404 918 A | 2/2005 | |
| WO | WO 02/18945 A2 | 3/2002 | |
| WO | WO 02/059603 A2 | 8/2002 | |
| WO | WO 2005/024695 A2 | 3/2005 | |
| WO | WO 2006/131225 | 12/2006 | |

OTHER PUBLICATIONS

B. de Heij, M. Daub O. Gutmann, R. Niekrawitz, H. Sandmaier & R. Zengerle „Highly parallel dispensing of chemical and biological reagents Analytical and Bioanalytical Chemistry (2004), p. 119-122, DOI: 10.1007/s00216-003-2294-2.

A. Schober, R. Guenther, A. Schwienhorst, M. Doering & B.F. Lindemann: „Accurate high-speed liquid handling of very small biological samples BioTechniques, vol. 15, No. 2, Aug. 1993, p. 324-329, ISSN: 0736-6205.

* cited by examiner

RECOGNIZABLE CARRIER FOR OPTICAL MEASUREMENT METHODS

CROSS REFERENCES TO RELATED APPLICATIONS

This application is the U.S. National Stage of International Application No. PCT/EP2010/002827, filed May 4, 2010, which designated the United States and has been published as International Publication No. WO 2010/127834 and which claims the priority of German Patent Application, Serial No. 10 2009 019 476.2,filed May 4, 2009, pursuant to 35 U.S.C. 119 (a)-(d).

BACKGROUND OF THE INVENTION

The invention relates to a recognizable carrier for determining physical, chemical or biochemical interactions using optical measurement methods, with a surface defining a substrate surface and having a base layer coated with reactive elements, which are in turn bonded to receptor molecules.

The invention also relates to a method for producing the recognizable carrier for determining physical, chemical or biochemical interactions using optical measurement methods, as well as applications according to the invention Coding of micro-arrays or, in general, of analytical carriers for recognizing patterns, so as to derive various information therefrom, has become more and more important, and the demand for these codings still increases. The type of codings has meanwhile become quite diverse, while still having individual differences.

DE 600 22 043 T2 discloses a micro-array chip with pattern recognition which has a specific spot pattern of reactive elements. Selective spots are used for pattern recognition. These spots are differentiated into those having a color-generating dye or at least a material capable of accumulating such dye, and those lacking this dye. In this way, a two-dimensional pattern is generated upon demand, wherein the pattern arrangement can be stored in databases and read out. A fluorescence marker is used as such identification dye. Because the pattern recognition proposed according to the state-of-the-art is two-dimensional, the information that can be conveyed with this pattern is limited. The use of fluorescent markers may adversely affect the sensitivity of the array and requires quite a complex measurement setup.

Conversely, WO 2005/024695 A2 attempts to overcome these disadvantages based on a method from bioinformatics, which uses the ubiquitous type of marking of micro-arrays and the recognition of such markings. The pattern recognition for the analysis of the investigated reaction must be differentiated from the recognition of data specific for the respective array. Typically, the marking for pattern recognition in an array is used as a unique one-time marker which allows a user to obtain corresponding information about the array from a database. To this end, the respective marker is incubated with the probe. Data which correspond to the binding pattern in the reaction are obtained from the reaction of the target structures in the probes to be tested with the stored information on the respective array. For example, when using fluorescent markers, a different color generation is detected and analyzed between the stored information and the reaction of the target structures to be tested. These data are then typically combined with identification codes physically applied on the arrays containing general information about the array. Such identification codes may be, for example, barcodes. These types of coatings are required and important for the analysis of the measurement data from the reaction. The conventional approach mentions as a disadvantage only that the identification codes physically applied on the arrays are typically not commonly accessible and readable. The barcode cannot be determined without the key for this barcode, a barcode reader or suitable database information, so that the entire information from the analysis cannot be evaluated. Situations where the barcode has errors and/or is read in with errors also create problems. The state-of-the-art circumvents these problems by a coding which is stored as a bit code in form of binary coding of decimal numbers (BCD code) or as binary ASCII code. In this way, one or more items of information are coded for each of array, which can be decoded again accordingly by using a computer-readable medium, and different types of information can be read out in combination. This conventional method for pattern recognition has also a two-dimensional design.

Another analytic chip with two-dimensional pattern recognition which can be used as a DNA micro-array is disclosed in WO 02/18945 A2. This analytic chip operates and recognizes data similar to a barcode. The different spot fields of the array are stored in form of binary codes at a defined location on the array. A barcode has hereby a one-to-one correspondence with molecular information of the target structures affixed on the array which are characteristic for the respective probe to be analyzed. If the analytic chip is used for gene analysis, the tested DNA fragments can be identified by a different coloration in the sample.

All aforementioned analytic chips operate according to analytic methods employing special markers, typically fluorescence markers. The respective proposed pattern recognitions are used to identify the tested species, and not to recognize the carrier for the purpose of quality and authenticity control for safety of use. Faulty starting material can then be identified either not at all or only unreliably and, more particularly, not be sorted out in time before the actual analysis.

The more recent measurement methods of reflectometric interference spectroscopy (RIfS), which has recently become more widely known through different publications dealing with different aspects, is capable of working without markers. This measurement method allows the direct testing of interactions between biomolecules, for example of antibody/antigen reactions. It is based on the determination of changes in the layer thickness on specially prepared biosensors and thus allows time- and spatially resolved testing of physical, chemical and/or biomedical interactions in or on a thin layer without markers.

The biosensor is substantially composed of a two-dimensional carrier having a specially activated and pre-treated surface configured to receive through covalent bonding a reaction partner required for measuring the biomolecules. For example, when antibody/antigen reactions are to be tested, the corresponding antibody is immobilized on the two-dimensional carrier.

The reaction partner is generally selected so as to have matching recognition structures for recognizing and binding the species to be analyzed. This means that the coating is selected so as to correspond or be similar to the respective species to be analyzed.

The probe to be analyzed is then brought into contact with the specially coated carrier having the reaction partner, the biosensor. In a following incubation phase, the species to be analyzed in the sample can bond to the corresponding molecule structures of the carrier coating. The incubation phase is terminated after a predetermined time by rinsing the carrier. The interaction between the species in the sample to be analyzed and the carrier coating can be directly measured as a change in the layer thickness. The detection method is hereby based on the interference of light having a defined wavelength through reflection at the boundary surface of the thin transparent carrier layer. The obtained interference spectra can be correlated with the changes in layer thickness.

As these brief fundamental explanations already show, an aspect to be taken into consideration when performing the reflectometric interference spectroscopy relates to the specific preparation of the carrier used for the measurement, for example the antigen/antibody interactions in physiological fluids.

WO-A-2006/131225 discloses a conventional approach which describes the preparation of the carrier in more detail. Before a substance corresponding to the species to be analyzed or (optionally) derivates thereof is deposited on the carrier, the carrier surface is first activated and subsequently modified with 3-glycidyl oxypropyl trimethoxy silane (GOPTS) by applying this substance over the surface of the carrier and covering the surface of the carrier with an additional carrier, producing a sandwich arrangement. Such sandwich arrangement is advantageous, because two carriers having the same quality can be prepared simultaneously. However, this is not necessarily required. The carriers obtained in this way are left to dry in their sandwich arrangement and can subsequently, after a predetermined elapsed time, be further processed by rinsing with a suitable fluid for receiving the species to be analyzed or a derivate thereof, i.e., for selective reaction with the species or derivate. Physiological fluids which may be tested using this carrier include, inter alia, blood serum and blood plasma.

Because the reflectometric interference spectroscopy can be used for an analysis in the field of food industry, medicine and environment, including water analysis, these are subject to significantly greater requirements regarding their safety of use compared to other analytic methods. It must be ensured that the measurement result cannot be falsified by faulty starting material. Also, the increase in product piracy requires that the analytic processes and the materials used therewith can be identified and tracked.

The future application of reflectometric interference spectroscopy in sensitive areas of medicine and food industry can expect additional pressure regarding product safety. The FDA (Food and Drug Administration) in the US as well as the EMEA (European Agency for the Evaluation of Medical Products) in Europe plan to mandate proof of authenticity for drugs and medical products through certified original manufacturer data, which will be expanded to sensitive analytical methods and their required components, like the two-dimensional carriers used here for analysis.

In order to attain this goal, a so-called Data Matrix Code has already been developed as a two-dimensional code. In its best-known application, a permanent directly label inscribed with laser light is used in the field of analytical instruments and instruments in chemistry and medicine. Several predetermined code patterns, typical in the form of a square or rectangular code image, are employed herein. These are defined and described in DIN standards, and are therefore capable of providing mandatory worldwide data and product safety. However, they cannot be used for applications of reflectometric interference spectroscopy, because they may on one hand, when applied on the substrate surface, falsify the analytical results because the code information is encoded in very compact form as a pattern of dots. On the other hand, there is the additional difficulty that the code scanner required for checking the code is incapable of reading the data out and checking the data in the analytic process itself. In addition, these codes are also not sufficiently informative, because they identify the basic material, but not the actual coating.

It is therefore the object of the present invention to optimize the specific preparation of a carrier which is used for performing optical measurement methods and which is suitable to test and to determine any type of physical, chemical or biochemical interaction, wherein the carrier is optimized with respect to quality assurance so that the method can be performed more safely and with less errors, and to satisfy future regulatory requirements and restrictions.

SUMMARY OF THE INVENTION

This object is attained according to the invention by a carrier for determining physical, chemical or biochemical interactions using optical measurement methods, with a surface defining a substrate surface having a base layer coated with reactive elements, wherein the reactive elements bind, on one hand, to receptor molecules, wherein the carrier can be recognized according to the invention in that it has an implicit coding. This is achieved by providing the base layer and/or the reactive elements with a void pattern forming a coding and/or by providing the reactive elements with linker molecules forming a coding. The selective codings provided altogether or in different combinations are used to control the originality and quality of the carrier, thus making this control actually possible.

Optical measurement methods generally refer to measurement methods capable of measuring changes of parameters, such as a change in the refractive index n, the physical layer thickness d or the optical layer thickness $n*d$. These include general spectroscopic methods, reflectometric method, such as ellipsometry and modifications thereof, which also includes the aforementioned reflectometric interference spectroscopy (RIfS). However, pure intensity measurements are also included, i.e., those measurements where only relative intensities are measured and measurement results are obtained based on their comparison.

According to the invention, a carrier may be individually marked and thereby made distinctive. This carrier may be, for example, two-dimensional, preferably at least planar. Within the context of the invention, any carrier is included which can be used for optical measurement methods, such as spectroscopic methods, and/or intensiometric measurements, which also includes the reflectometric interference spectroscopy.

Because the marker can be disposed in any layer, i.e., in the base layer applied on the substrate surface, as well as in the reactive elements coupled thereto, optionally in combination with each other, selective markers can be safely applied which are tailored to the various possible applications of the spectroscopic methods and intensiometric measurements.

The coding of the reactive elements by way of specific linker molecules provides the advantage of an invisible signature which is inaccessible to forgers and allows a safe verification of the authentic origin of the carriers.

By marking the base layer according to the invention and/or by marking the reactive elements by way of specific linker molecules, many advantages for quality control and quality safety become possible which could hitherto not be attained.

For example, the carriers may be subjected to a batch control, delivery control and a later control during storage, which obviates the need for bringing the carrier already into contact with the sample to be tested. Conventionally, codings are known and have been used which can be referred to as explicit codings, in that a reference provided for the control is brought into contact with a counter probe so as to be able to differentiate from the results of the measurements original merchandise from counterfeits. According to the invention, this approach is contrasted with controls to be referred to as implicit codings, wherein a counter probe becomes unnecessary. The carrier prepared for a measurement and to be tested for authenticity with the fully formed base layer coated with the reactive elements, which may be for example antibodies, is tested for the applied coding. The obtained signal producing the code can be referred to as a dry signal, because it involves a test without requiring or involving, for example, an antibody/antigen interaction. Antigens would only be found in the probe to be measured. However, the probe is to remain unused until the carrier used for the measurement is identified as an original product. If the obtained dry signal with its coding corresponds to a code pattern recorded and controllable, for example, in a prepared lookup table, then the carrier is released for the actual measurement. Otherwise, an alarm is triggered, identifying the carrier as counterfeit.

Lookup table in the sense of the present invention refers to a data structure which is prepared, predefined and stored in or on a computer medium, which is intended to enable quick matches of code patterns in control measurements and to identify these as genuine or as counterfeit. Advantageously, such lookup tables provide a quick match which is particularly required for routine tests. The coding applied to the carrier is stored in the lookup table as a so-called complementary code and can then be recalled with the desired and required speed.

When this quality control, which can also be referred to as safety or access control, is applied on carriers having the form of micro-titer plates, the corresponding row content can additionally be encoded with a special pattern. In other words, at the bottom of defined, predetermined wells, i.e., recesses in the micro-titer plates, but not in all wells, a pattern is applied as previously described for the carrier, and in addition the wells which include this pattern are predetermined. The row content of the micro-titer plate is also encoded, which can already be used to determine if a carrier in form of a micro-titer plate is counterfeited or not. This increases the possibilities for control and hence the safety of the following actual measurement.

In addition of a possible counterfeit, accidental damage to the respective carrier, for example in form of transport damage, as well as aging of the material can also be considered, and provisions for testing must exist.

Whereas a continuing accidental integrity of the rather small and discrete barcode region may be tolerated with direct coding via barcodes, the indirect coding according to the invention distributed over a larger area by way of void patterns and linker molecules, and the coding of the row contents of micro-titer plates allows easier testing of the carrier for integrity and/or aging damage.

According to another embodiment, the substrate surface additionally includes a macroscopic two-dimensional pattern applied by laser light or chemical etching and forming a coding, wherein the pattern of the base layer forming the coding corresponds to the macroscopic two-dimensional pattern of the substrate surface.

The macroscopic two-dimensional pattern applied by laser light or chemical etching on the substrate surface then form simple islands on which the base layer cannot be applied, so that the pattern of the substrate surface repeats or continues in the base layer.

Unlike conventional two-dimensional codings, for example the barcode, it is possible with the invention to apply code markings in each of the layers formed on the carrier, including the substrate surface itself, allowing to distinguish original samples from counterfeit samples. In this way, the product safety can be controlled in several ways especially in applications in the health or medical field, where the product safety has to be fully guaranteed.

With respect to the aforementioned linker molecules, with which the reactive elements may be provided, whereby generally marker agents are contemplated which perform their function, and their particular advantage of creating invisible signatures based on their chemical structure which cannot be recognized by potential counterfeiters, it should be particularly mentioned that these linker molecules can of course be combined with the codings of the additional layers and the substrate surface.

In general, with a carrier according to the invention, pattern formation on the substrate surface can correlate with the formation of voids in the base layer; additionally, special linker molecules, for example marker agents, may generate a coding pattern with the reactive elements. All pattern formations are predetermined, i.e., predefined, and can therefore be checked separately or coupled in a single scan by way of a lookup table if they are genuine or counterfeit, or for aging or for damage. This is not possible with conventional codings.

When the active elements are provided with linker molecules forming a coding, the linker molecules of the reactive elements forming the coding may have basic structures with oligomer molecular components derived from alkenes.

It can be generally stated that suitable linker molecules couple via a covalent bonds in a defined distribution with the respective functional end groups of the reactive elements. To this end, the linker molecules themselves have a suitable functional group coupled to a biological compatible molecular component. Such molecular components may be groups which are derived from the alkenes and are preferably oligomers.

N-hydroxy succinimide should be mentioned as a suitable exemplary coupled compound, as well as epoxy-modified molecular components capable of coupling via the epoxide group.

The reactive elements are coupled with the linker molecules by specifically applying the linker molecules commensurate with the desired coding pattern.

The planar or two-dimensional carrier according to the invention can also be formed as a simple flat glass slide or a micro-titer plate. The bottom of the respective well of the micro-titer plate defines here a planar carrier. When the carrier is formed as a micro-titer plate, it is preferably made at least partially of borosilicate glass. It is hereby sufficient if the respective bottom is formed of borosilicate glass.

Alternatively, the planar or two-dimensional carrier may be made of plastic in form of a flat carrier or as a micro-titer plate.

The carrier may also have on its surface mirror-like and/or white reflecting elements. These can preferably be selected from aluminum, zinc oxide, titanium oxide or mixtures thereof. This may have advantages for evaluating the coding, because relative values can then be easily formed.

The invention also relates to a method for producing a recognizable planar or two-dimensional carrier for spectroscopic methods and/or intensiometric measurements, for example for reflectometric interference spectroscopy on thin layers, for determining physical, chemical or biochemical interactions, wherein the carrier is first activated on a surface defining the substrate surface and subsequently modified with a binding partner by forming a base layer in order to receive as reactive element(s) a selected reaction partner which is specific for the interaction, wherein the reactive elements are in turn bonded to a receptor molecule. For this purpose, a void pattern is applied to the base layer and/or the reactive elements, and/or the reactive elements are provided with linker molecules or marker agents. The respective positioning of the void patterns and/or the coupling of the reactive elements to linker molecules or marker agents for controlling authenticity and quality of the carrier is performed according to a predetermined verifiable pattern in form of an implicit coding.

Unlike with conventional codings, coding having enhanced security can be produced with the method of the invention. The reason is, inter alia, that the substrate surface and/or the base layer and/or the reactive elements coupled to the base layer with their pattern can initially be regarded as a two-dimensional structure, which is not very different from a conventional coding, for example a barcode, with respect to the dimensionality. Because the design of the coding pattern on the substrate surface, the base layer and/or on the reactive elements can freely take advantage of the spatial orientation, a third dimension is opened for the structure recognition. The entirely variable, changeable positioning of the pattern on the carrier can also be regarded as the third dimension. Combined with a required pattern recognition in the read-out of the coding, jump addresses can hereby be generated and also stored in a lookup table as a third dimension. In other words, the correct jump address can be associated in the selection process.

According to another embodiment, a macroscopic, two-dimensional pattern forming a coding is initially applied on the substrate surface by laser light or etching and/or subsequently the base layer is applied, wherein in an additional process step, the base layer is washed out with a solvent in the region of the pattern previously applied on the substrate surface, while simultaneously receiving the pattern from the substrate surface. Because the binding partner is missing due to the washing step when the reactive elements are subsequently received at these locations, the pattern of the substrate surface continues automatically and very precisely across the base layer to the reactive elements. The pattern generated on the substrate surface is thereby completely transferred over several reaction steps.

In the context of the present invention, the term etching should be broadly understood and includes all possibilities of chemical, physical-chemical, physical etching, but also ablation, i.e., material removal in the most general form.

A preferred etching process is hereby dry etching, wherein material is removed on the substrate surface by particles generated in a gas plasma. Such approach is known to date from the semiconductor technology.

One form of this dry etching is physical etching or sputter etching with argon or other noble gas ions, which caused material removal with their kinetic energy alone, without involving a chemical reaction.

Another form of dry etching is chemical etching, wherein etching effect is produced by free radicals in the gas plasma. The etching effect is therefore of a chemical nature. With respect to the precision of the etch pattern to be produced, this form of etching is advantageously isotropic and therefore directional.

However, if the etching should be non-directional, the method of the physical-chemical etching is better suited, which is also a form of chemical etching; however, the generally volatile etch product is typically formed only at the substrate surface from the noble gas ion and a molecule.

Alternatively, the base layer may be applied on an intact substrate surface that has not been changed by etching or another process and thereafter be selectively removed according to a predetermined pattern.

Alternatively, the substrate surface may initially be activated and the base layer may subsequently be formed in an additional activation with a binding partner by applying a mask, with the macroscopic two-dimensional pattern being formed by the free regions covered by the mask.

With this additional embodiment of the method of the invention, recognizable carriers are provided which are particularly capable to serve as security elements against counterfeits. This particular security is generally achieved by combining the so-called explicit coding for the purpose of the present invention with a so-called implicit coding likewise for the purpose of the present invention. Explicit coding hereby designates a coding in form of etching which can be read by third parties and thus recognized and copied; alternatively a coding in form of a predetermined pattern or an engraving known from printing or by way of a matrix code. Implicit coding refers to, for example, the void pattern on the base layer, preferably coupled with the patterns provided by the reactive locations. A substantially counterfeit-proof coding is obtained by a cross-correlation of the explicit with the implicit coding. It is important for the implicit coding that it is immanent in the system, i.e., is inseparable from the carrier and the coating applied on the carrier, including the coupling with the reactive elements, and can therefore be recognized only with special suitable reading devices.

Preferably, a reading device is employed which is the used for the computerized evaluation of interactions between the respective tested biomolecules which, for example, in the case of reflectometric interference spectroscopy is based on the determination of the changes in the layer thickness of the thin layer. I.e., the coding for recognizing the carrier can also be checked at the same time with a reading device coupled with the photometric evaluation device.

Accordingly, the alternative and linked embodiments for the formation of a pattern on the base layer, optionally in cooperation with the pattern only be applied on the substrate surface, and/or a pattern which is composed of the structural arrangement of the reactive elements located on the base layer, preferably in combination with an intentional arrangement of voids, or of a pattern consisting in the structural arrangement of the reactive elements disposed on the base layer, preferably in combination with an intentional arrangements of voids, enable the recognition of the employed carrier and thus the safety of the analytical system by using a reading device coupled with the computer system of the evaluation unit. Fundamentally, and particularly also in view of the reactive elements, not only patterns can be recognized. In the simplest case, for example in a so-called multi-.spot application, i.e., when the finished prepared base layer is occupied multiple times with a basically conventional dosing system, the arrangement of the produced spots in a predetermined geometric pattern can also be used (together) as coding.

On the other hand, a standard pattern may be defined and a predetermined deviation from this standard pattern may be set, which can in turn be used for coding. When the carrier produced in this way and the geometric position of the spot is measured with scanners, a predeterminable result having an offset from the maximum is produced commensurate with the variation, which is significant for the respective selected coding.

With respect to the reactive elements, there is an additional possibility beyond what has already been described for providing a forgery-proof coding. These reactive elements can be different from another, with one of them specifically selected for the measurement of the sample to be tested later, whereas others are used exclusively for coding. With the conventional method of multi-spot application, the reactive elements required for a measurement and the reactive elements required for the coding can be applied, on one hand, in a predetermined quantity and, on the other hand, also with a predetermined geometric arrangement. This correlation between quantity and location results in a forgery-proof code which can be quickly tested by scanning.

The invention furthermore relates to applications of the carrier according to the invention in one of the above-described embodiments for analyzing biomolecules in security checks, access checks or in in-vitro diagnostics.

The carrier in these applications is produced in the manner described above.

BRIEF DESCRIPTION OF THE DRAWING

The invention will now be described in more detail with reference to exemplary embodiments and the appended drawings.

It is shown in.

DETAILED DESCRIPTION OF PREFERRED EMBODIMENTS

Exemplary Embodiments

When a recognizable carrier modified according to the invention is to be produced, the process for producing a surface coating can generally be described by the steps cleaning and activation of the substrate surface, forming a base layer, preferably by silanization, immobilization of the reactive elements in form of a selected biopolymer, and functionalizing the immobilized biopolymer with so-called receptor molecules to be defined in more detail below.

Coating a Glass Carrier with a Macroscopic Two-dimensional Pattern Forming a Coding I.1 Forming a Coding on the Substrate Surface by Spotting According to this exemplary embodiment, an object slide carrier is used as an exemplary glass carrier. The use of this object slide carrier is only one example. It is also possible and, depending on the application, even preferable, to use a glass known to a person skilled in the art that is different from the object slide carrier, for example a glass with an optical coating.

The glass carrier is initially cleaned by immersion for at most 1 minute in 6 N KOH and subsequently rinsed with ultrapure water. The glass carrier is then activated by generating OH groups on the glass surface. This glass surface will hereinafter be referred to as substrate surface.

The substrate surface is activated with freshly prepared piranha solution. With full-surface activation, the glass carrier is treated for about 15 minutes with the freshly prepared piranha solution in an ultrasound bath, and subsequently thoroughly rinsed with ultrapure water and dried in a flow of nitrogen. The term piranha solution refers to peroxymonosulfuric acid which is prepared in the present example by addition of concentrated sulfuric acid to a 30% hydrogen peroxide solution in a volume ratio of concentrated sulfuric acid to hydrogen peroxide solution of 3:2.

It proved initially quite difficult to form a recognizable reliable coding on the substrate surface during this activation. The problem is here to intentionally apply a precisely defined, spatially resolved pattern. This was attained in one embodiment by spotting, using the TopSpot® method. With this method, a contactless and especially simultaneous and spatially well resolved application of the piranha solution on the substrate surface in a dense pattern corresponding to the desired coding pattern became possible.

The TopSpot® technology is commercially available from the company Biofluidix GmbH, Freiburg, Germany.

The TopSpot® method is based on a micro-structured print head made from a silicon carrier with an array of up to 96 circular nozzles. The silicon core is surrounded by Pyrex. The piranha solution is then filled into a reservoir of the print head provided and is transported exclusively by capillary forces to the centrally located nozzles which are arranged in a grid pattern of 500 µm. The print head is then installed in a print module which includes the actual drive. A piston, which is movably supported on a flexible seal above the nozzle window, is used for releasing droplets. The piston is displaced by controlling a piezo-actuator. This displacement produces a pressure pulse in the closed air chamber between the piston and the nozzles. This pressure pulse operates on all nozzles simultaneously. As a result, a single liquid droplet is simultaneously released from each of the nozzles. The volume of these droplets is in this pneumatic method about 1 nL (de Heij, B., Daub, M., Gutmann, O., Niekrawietz, R., Sandmaier, H. & Zengerle, R., (2004) "Highly parallel dispensing of chemical and biological reagents", Analytical and Bioanalytical Chemistry, 378, 119-122).

With this method, a precisely defined, spatially resolved pattern can be reproducibly produced on the substrate surface, making it possible to distinguish regions defined by the piranha solution from the non-activated regions. With the same success, i.e., with the same quality, patterns with different spatial resolution were formed on the substrate surface.

I.2 Forming a Coding on the Substrate Surface by Printing

In this exemplary embodiment, an object slide carrier was again used and activated with piranha solution in the same manner as described in the first exemplary embodiment under I.1.

A recognizable reliable coding on the substrate surface through specific application of a precisely defined, spatially resolved pattern was formed in this exemplary embodiment by printing using a MicroDrop dosing system.

Such MicroDrop dosing system is commercially available from microdrop Technologies GmbH, Norderstedt, Germany.

The MicroDrop dosing system is based on the technology of inkjet printers. With a piezo-pump consisting of a capillary with a piezoelectric element, a very rapid pressure increase is generated which propagates with the velocity of sound through the fluid to the nozzle opening and actively displaces a quantity of fluid in a capillary, causing a fine fluid column to exit the nozzle with high acceleration. The ejection is so fast that the fluid is ejected without wetting the capillary edge. Droplets in a range of 50 pl to 500 pl, corresponding to a droplet diameter of 300 µm to 100 µm, can be produced. Either a XYZ table or a suitable robot is used for positioning the droplets (Schober, A., Guenther, R., Schwienhorst, A., Doering, M. Lindemann, B. F., (1993), "Accurate high-speed liquid handling of very small biological samples", Biotechniques, 15, 324-329).

This method also produced a precisely defined, spatially resolved pattern on the substrate surface, which made it possible to accurately distinguish the regions activated by the piranha solution from the non-activated regions.

With the same success, i.e., with the same quality, patterns with different spatial resolution were formed on the substrate surface.

I3. Formation of a Coding on the Substrate Surface with $O_2$ Plasma

As an alternative to the methods described under I.1. and I.2. for generating precisely defined, spatially resolved patterns on the substrate surface by specific activation with piranha solution, activation can also be performed with $O_2$ plasma.

Preferably, glass carriers with a coating that is unstable with respect to acid are used. Such glass carriers are known in the art. Possible coatings include, for example, $TiO_2$ and ZnO.

However, carriers made of plastic can also be used, such as carriers made of TOPAS (cyclo olefin copolymer (COC) from the company Topas Advanced Polymers GmbH, Frankfurt a.M., Germany) or PMMA (polymethylmethacrylate), to mention only an exemplary selection.

In the exemplary embodiment, a TOPAS plastic carrier was activated for 15 minutes in an oxygen plasma (300 W, 0.8 mbar $O_2$). Advantageously, the surface of this treatment is simultaneously also cleaned, potentially eliminating a prior cleaning step.

In order to reproducibly produce a precisely defined, spatially resolved pattern on the substrate surface with this kind of activation, a mask made of a Teflon® corresponding to the respective desired pattern was used. This mask was pressed onto the substrate surface during the activation. All parts of substrate surface covered by the Teflon mask remained non-activated.

This method was then also capable to reproducibly produce a precisely defined, spatially resolved pattern on the substrate surface, which made it possible to accurately distinguish regions activated by the oxygen plasma from the non-activated regions covered by the mask.

With the same success, i.e., with the same quality, patterns with different spatial resolution were formed on the substrate surface.

As an alternative to the activation by oxygen plasma, activation with a barrier discharge can also be used.

II. Forming a Coding in the Base Layer
II.1. Forming a Coding in the Base Layer with a Full-area Activated Substrate Surface A glass carrier is cleaned and activated, as described initially in general terms above in the first and second paragraph of I.1.

The substrate surface of the glass carrier is then prepared for a surface treatment in form of silanization with epoxy groups, which in the exemplary embodiment is performed with epoxy silane in form of 3-(glycidyloxypropyle) trimethoxy silane (GOPTS). As an alternative, for example, phenethyl trichloro silane, octadecyl trichloro silane or other corresponding compounds can be used.

15 µL/cm$^2$ GOPTS are applied on the cleaned and activated substrate surface of the glass carrier.

II.1.1. Forming a Coding by Spotting

In this case, the TopSpot® method described in detail above under I.1. is used again. Different patterns were applied. It was observed that with this method the GOPTS could be applied each time on the substrate surface contactless and more particularly simultaneously and with clean spatial resolution, and in addition with a tight grid pattern corresponding to the desired coding pattern.

II.1.2. Forming a Coding by Printing

Again, the MicroDrop dosing system was used, which was described above in detail under I.2. This method was also capable of reproducibly producing a precisely defined, spatially resolved pattern on the substrate surface, wherein regions covered by GOPTS could be clearly differentiated from the regions that were not covered.

With the same success, i.e., with the same quality, patterns with different spatial resolution were formed on the substrate surface.

II.1.3. Forming a Coding Through Deactivation with Laser Light or Chemically

A glass carrier is cleaned and activated, as initially described in general terms above in the first and second paragraph of I.1.

The entire area of the substrate surface of the glass carrier is then subjected to a surface treatment in form of a silanization with GOPTS.

Subsequently, precisely defined regions are deactivated with laser light with spatial resolution. In the exemplary embodiment, a conventional IR laser is used.

Precisely defined regions can also be chemically deactivated with spatial resolution. The silanol groups are here condensed with precise definition.

II.1.4. Forming a Coding by Using Different Silanes

In accordance with the aforedescribed method of spotting with to the TopSpot® method or printing with the MicroDrop dosing system, the base layer is formed from two different silanes, on one hand GOPTS and on the other hand a silane lacking reactive groups in form of the epoxy groups.

Spotting and/or printing are then specifically performed such that regions of the substrate surface to be activated are covered with GOPTS, whereas the other regions are covered according to a defined pattern with the silane that lacks epoxy groups and therefore does not enable activation of the base layer at these locations. In this way, the code is formed in the base layer.

II.1.5. Forming a Coding by Subsequent Deactivation

The carriers treated over the surface area with GOPTS can also be rendered inert for subsequent binding of the reactive elements by spatially-resolved deactivation of the active group in the step to be described below. The deactivation can also be accomplished, for example, through specific application of water, wherein the deactivation takes place by hydrolysis. The specific application can once more be performed with the TopSpot® method or with the MicroDrop dosing system.

II.2. Forming a Coding in the Base Layer Through Activation of the Substrate Surface With Coding A cleaned and activated glass carrier is used, as described above under I. The substrate surface has already been provided with a coding according to one of the methods described above under I.

The substrate surface of the glass carrier is thereby prepared for a surface treatment in form of silanization with epoxy groups, which in this exemplary embodiment is performed again with an epoxy silane in form of 3-(glycidyloxypropyle) trimethoxy silane (GOPTS). As an alternative, phenethyl trichloro silane, octadecyl trichloro silane or other corresponding compounds can again be used.

15 μL/cm² GOPTS are applied to the cleaned and activated substrate surface of the glass carrier. However, these can bind to the substrate surface only where the substrate surface is also activated. In this way, the code already formed on the substrate surface can be accurately imaged and reproduced in the base layer in every detail. Silane that is not bonded to the substrate surface is simply washed out by rinsing.

II.3 Further Treatment of the Base Layer that was Activated and Coded Through Silanization After GOPTS or alternatively another silane has been applied to the substrate surface, the carrier treated in this manner is, after an incubation time of one hour in a dry empty gas chamber, briefly rinsed with dry acetone having a water content of ≤0.1%, particularly monitoring for any GOPTS residues.

Because of the humidity of the air, the carrier(s) must be quickly further processed.

II.3.1 Coating with the Biopolymer Aminodextran as Reactive Element

Subsequently, aminodextran (AMD) is applied to the base layer prepared in this manner by applying 15-20 μL/cm² aminodextran solution (corresponding to 10 mg AMD in 20 L ultrapure water).

Application can hereby also occur by spotting or printing in the aforedescribed manner.

After incubation overnight in a chamber saturated with water vapor, the sample is thoroughly rinsed with ultrapure water and dried in a nitrogen flow.

II.3.2 Coating with the Biopolymer Di-amino-polyethylene Glycol as Reactive Element For immobilizing di-amino-polyethylene glycol (DA-PEG), 20 μL/cm² DA-PEG solution (corresponding to 4 mg DA-PEG in 1 mL dichloromethane) are applied to a glass carrier silanized with GOPTS and incubated in an open tray at 70° C., preferably overnight. Excess DA-PEG is subsequently rinsed with ultrapure water and the carrier is subsequently dried in a nitrogen flow.

The free COOH end groups of the PEG are then activated to an active ester.

III.3.3. Forming a Coding in the Coating Formed by Further Reaction with the Biopolymer In an analog manner, the biopolymer can only bind to the silane groups of the base layer where corresponding epoxy groups exist. The biopolymer therefore again accurately reproduces the code defined by the silane groups of the base layer in every detail.

So as not to unnecessarily increase the number of examples, reference is made in general to the resulting possibilities for coding which have each been tested in experiments.

When a coding was already performed on the substrate surface, as described above, the formed code is accurately imaged in the base layer in every detail, i.e., accurately reproduced by the silane groups. The biopolymer coupled to the epoxy groups of silane is also accurately reproduced in every detail. As a result, a very clean traceable coding is reproduced in every layer with almost zero error rate. This is important for the safety, especially in applications in the medical field.

The possibilities proposed so far also demonstrate that the coding can first be provided in the base layer—disregarding the substrate surface. The coding can also be implemented in the region of the coating with the reactive elements in form of the biopolymers, without necessarily requiring prior measures for coding the substrate surface and/or the base layer with respect to the silanization. This will be described in more detail in the following exemplary embodiment.

III.3.3. Forming a Coding with the Biopolymer

The reaction with PEG following the silanization with GOPTS is performed by using DA-PEG composed of two different PEG species. This is to be understood that a short PEG with only one head group is used in excess together with a longer PEG with two head groups.

DA-PEG with a molecular weight of about 2000 DA was used as a short PEG with only a single head group and DA-PEG with a molecular weight of about 6000 DA was used as a longer PEG with two head groups. The different PEG species were applied again on the carrier that was prepared by silanization by spotting or printing according to the aforedescribed methods in a specific predetermined pattern commensurate with the desired coding.

In addition, experiments were also performed by using a carrier where the silanized base layer already included the pattern of the desired coding and only the biopolymer needs to react. DA-PEG from two different PEG species was here also used, as described above. The PEG species were mixed, providing the advantage of producing a surface with less reactive groups, while however simultaneously providing improved binding conditions for the additional binding with the receptor molecules, for example in form of antibodies.

II.4 Immobilization of the Receptor Molecules

The aforedescribed coating with the reactive elements, which had on its surface or was coated on its surface with either the coding transferred using at least one of the above treatment steps and/or a new coding produced by specific application of DA-PEG having different molecular weights, can in the following be used for immobilizing receptor molecules.

Alternatively, a further treatment is performed by re-functionalization such that they subsequently have carbonyl functions.

For this purpose, the amines forming the coating of the reactive elements are incubated with 15 μL/cm2 glutaric acid anhydride solution (corresponding to 2 mg glutaric acid anhydride in 1 mL dry DMF) for six hours in a glass chamber saturated with DMF and subsequently rinsed with DMF and ultrapure water. The carrier is then dried in a nitrogen flow.

A coding applied to the respective amine, as described above in one of the alternative approaches, is transferred substantially error-free.

II.4.1 Immobilization of the Receptor Molecules with Reactive Elements which Each have at Least One Carbonyl Group For immobilizing a receptor molecule with a carbonyl group, an amino-functionalized glass carrier of the type described above is used. A solution of 1 mg receptor molecule in 10 μL DMF with a water content of ≤0.1% and 50 mL DIC (di-isopropyl carbodiimide) is applied to the coded base layer with the biopolymer and incubated for at least six hours in a chamber saturated with DMF.

For immobilizing receptor molecules which each have an amino group, the biopolymers re-functionalized, as described above, so that each have a carbonyl function, are activated with 15 µL/cm$^2$ of a NHS/DIC solution (15 mg NHS in 100 µL dry DMF and 30 µL DIC) for about four hours in a chamber saturated with DMF, whereafter rinsed with dry DMF and dry acetone, and dried in a nitrogen flow.

The receptor molecules can subsequently also applied to the surface prepared in this manner from aqueous solutions and with different concentrations.

The coding transferred from the substrate surface and/or the silanization of the base layer and/or the coating of the base layer with the biopolymer (amine) can still be transferred to the receptor molecules essentially error-free because the corresponding non-activated regions of the biopolymers are incapable of binding receptor molecules. It is also possible to apply a coding for the first time by specifically applying the receptor molecules commensurate with a desired pattern.

In the experiments performed for the purpose of the present invention, these patterns are applied by spotting as well as by printing according to the aforedescribed methods.

Antibodies which are bonded covalently via peptide bonds to the coating formed by the biopolymers should be mentioned as an example of receptor molecules used for demonstration purposes in the described exemplary embodiments, which are also of great importance for practical applications.

IV. Coating a Micro-titer Plate Made of Glass

For sake of simplification, it is noted at this point that the aforedescribed experiments and coding steps were not only tested on an object carrier, but also in another series of experiments on a micro-titer plate made of glass.

A conventional commercially available rectangular micro-titer plate, also referred to as well-plate or multi-well plate, with an average surface roughness was used, which has 8 rows and 12 columns of isolated cavities, also referred to as troughs or wells. The fill volume of the cavities is between 0.3 and 2 mL.

In addition to these 96-type micro-titer plates, a micro-titer plate with only 24 cavities arranged in 4 rows and 8 columns was used, with the cavities having each a fill volume of 0.5 to 3 mL.

The wells of the employed plates have a flat bottom or a bottom with a U-shaped depression. Each of the bottoms or each of the depressions itself forms a surface which defines, in analogy to the glass carrier, a substrate surface and which can accordingly have a coding on the substrate surface and/or as a result of the silanization of the base layer and/or the application of a biopolymer on the base layer, which is transferred substantially error-free to the reactive elements.

In the same way, flat carriers and micro-titer plates made of plastic were tested which are also suitable. Commercially available, substantially transparent micro-titer plates were used, which are commercially manufactured from, for example, polystyrene.

In the following, the formation of the coding will again be illustrated with respect to a commercially available glass micro-titer plate with reference to the figures of the drawings. The methods described in detail above for the object carrier made of glass are used for forming the coding(s).

Figures 1A, 1B:
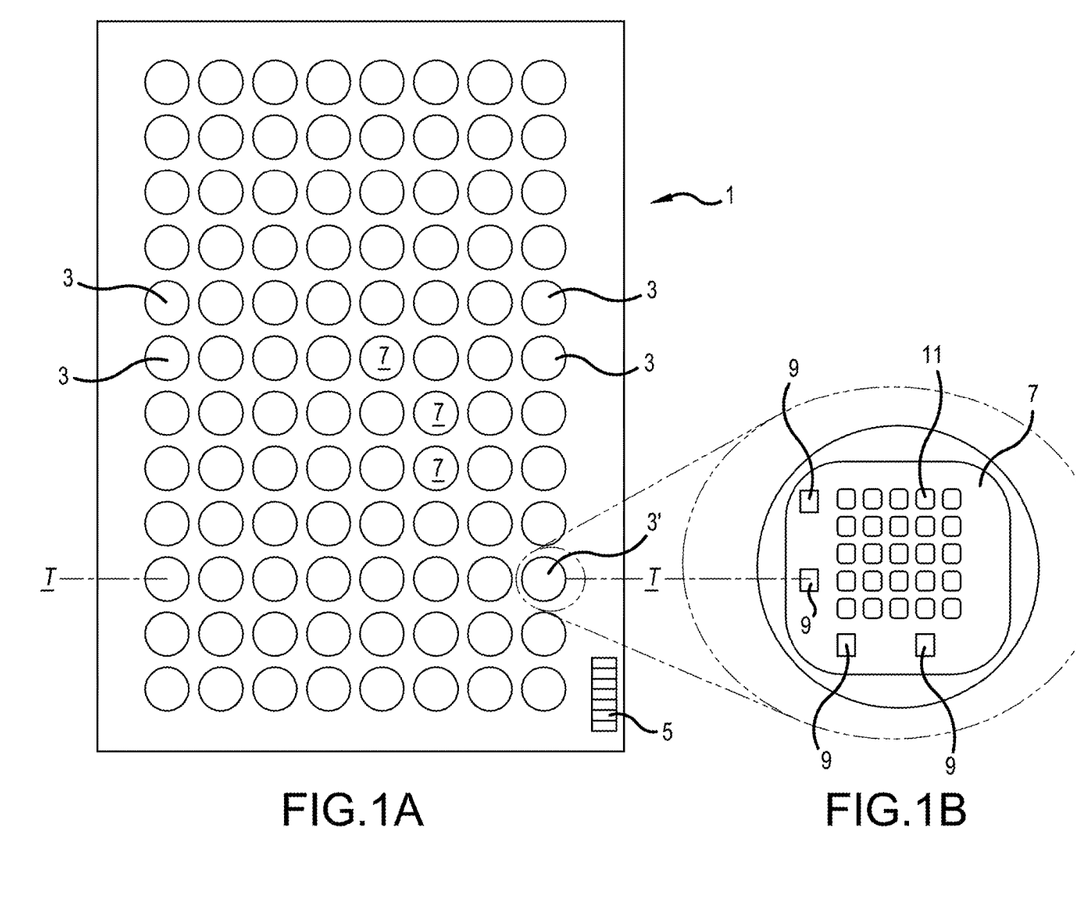
FIG. 1a a micro-titer plate with a plurality of wells arranged in rows, with a partially applied coding.
FIG. 1b a top view onto a selected well of the micro-titer plate in the region of the cross-sectional line I-I in FIG. 1.

FIG. 1a shows a micro-titer plate 1 having wells 3 arranged in a plurality of rows and columns, to which partially a coding is applied. The micro-titer plate 1 provided with the coding of the invention furthermore includes a conventional plate coding 5 in form of a barcode. The bottoms of the wells 3 have a layer sequence according to one of the aforedescribed embodiments. A well 3' is selected in the region of the cross-sectional line I-I and is illustrated in FIG. 1b in more detail in a top view, with the coating 7 clearly visible. The coating 7 has voids or holes 9 and regions applied by spotting, which will be referred to hereinafter as spots 11. The spots 11 each have a different height. This is shown in FIGS. 1c and 1d.

Figure 1C:
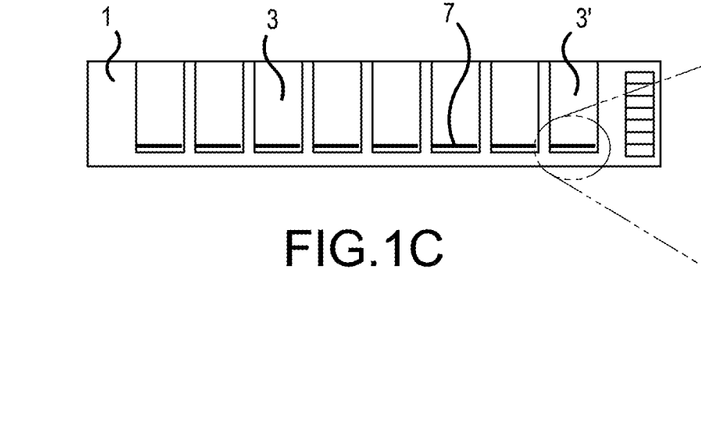
FIG. 1c a cross-section through the micro-titer plate having wells with a coating along the cross-sectional line I-I of FIG. 1.
Figure 1D:
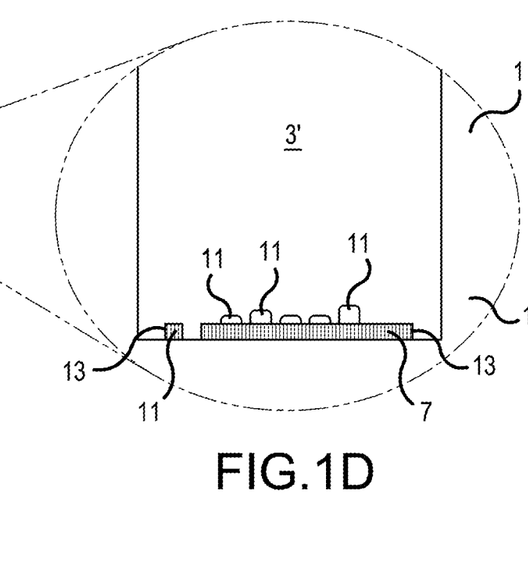
FIG. 1d a cross-section through a selected well of the micro-titer plate, as marked in FIG. 1c, with a coding in form of reactive elements applied as spots and arranged in different geometries.

FIG. 1c shows a cross-section through the micro-titer plate 1 along the line I-I, showing the coating 7 in the wells 3 of the micro-titer plate 1 with a coding in form of layer thicknesses having different heights of the reactive elements applied as spots 11. FIG. 1d shows in more detail the well 3' marked in FIG. 1c, which as a cross-section through the well 3' corresponds to the top view on the same well 3' of FIG. 1b and shows the applied coding in form of spots 11 having different heights of the applied reactive elements.

The identification of a forgery-proof multiple-coding is now available for recognizing the micro-titer plate 1 as a genuine product. This multiple-coding consists of the arrangement of the voids or holes 9, the height of the spots 11. The height of the coating 13 can also be measured independently. The plate coding 5 in form of the bar code is additionally matched in a conventional manner.

The present exemplary embodiments are intended as a detailed description of the carriers according to the invention and their potential use. They are intended to be explanatory and not limiting. Based on the examples and the general description, a person skilled in the art will recognize the large number of additional possible combinations of the codings according to the invention with each other.

The invention claimed is:

1. A recognizable carrier for the determination of physical, chemical or biochemical interactions using optical measurement methods, comprising:
    a plate surface,
    a well formed in the plate surface, the well having a sidewall and a bottom surface which is at least partially chemically activated and defines a substrate surface,
    a base layer disposed on the substrate surface and coated with reactive elements that binds to receptor molecules, and
    an implicit coding for controlling authenticity and quality of the carrier, wherein the implicit coding is formed by a void pattern and a plurality of spots formed on at least one of the base layer and the reactive elements, wherein
    the void pattern is formed by a plurality of voids or holes representing the implicit coding, and
    the plurality of spots are disposed in a predetermined arrangement and have different heights representing the implicit coding.

2. The carrier of claim 1, wherein the carrier is planar.

3. The carrier of claim 1, wherein the substrate surface comprises an additional microscopic two-dimensional pattern applied with laser light or by chemical etching to form a coding forming pattern, and wherein the void pattern of the base layer and at least partially the pattern of the reactive elements correspond to the macroscopic two-dimensional pattern of the substrate surface.

4. The carrier of claim 1, wherein the reactive elements comprise basic structures derived from alkenes with oligomer molecular components.

5. The carrier of claim 1, wherein the carrier is made of glass in form of a flat carrier or a micro-titer plate.

6. The carrier of claim 1, wherein the carrier is made of plastic in form of a flat carrier or a micro-titer plate.

7. The carrier of claim 5, wherein the glass forming the micro-titer plate comprises borosilicate.

8. The carrier of claims 1, wherein the plate surface of the carrier is reflecting or comprises elements selected from aluminum, zinc oxide, titanium oxide or mixtures thereof.

9. The carrier of claim 1, wherein
   the void pattern is formed on both the base layer and the reactive elements.

10. The carrier of claim 1, wherein
    the sidewall of the well has a predetermined height, and
    the heights of the plurality of spots are lower than the predetermined height of the sidewall of the well.

* * * * *